US012762353B2

(12) United States Patent
Gholami et al.

(10) Patent No.: US 12,762,353 B2
(45) Date of Patent: Oct. 13, 2026

(54) METHODS AND SYSTEMS FOR TRANSFERRING KNOWLEDGE FROM LARGE LANGUAGE MODELS TO SMALL LANGUAGE MODELS USING OUT-OF-DISTRIBUTION FEEDBACKS

(71) Applicant: Huawei Cloud Computing Technologies Co., Ltd., Guian (CN)

(72) Inventors: Mohsen Gholami, Vancouver (CA); Mohammad Akbari, Coquitlam (CA); Vaden Wybert Masrani, Vancouver (CA); Yong Zhang, Richmond (CA)

(73) Assignee: Huawei Cloud Computing Technologies Co., Ltd., Guian (CN)

( * ) Notice: Subject to any disclaimer, the term of this patent is extended or adjusted under 35 U.S.C. 154(b) by 160 days.

(21) Appl. No.: 18/536,435

(22) Filed: Dec. 12, 2023

(65) Prior Publication Data

US 2025/0190712 A1 Jun. 12, 2025

(51) Int. Cl.
*G06F 40/40* (2020.01)
*G06F 16/3329* (2025.01)

(52) U.S. Cl.
CPC .......... *G06F 40/40* (2020.01); *G06F 16/3329* (2019.01)

(58) Field of Classification Search
CPC ............................. G06F 40/40; G06F 16/3329
See application file for complete search history.

(56) References Cited

U.S. PATENT DOCUMENTS 11,361,571 B1 * 6/2022 Fusco ..................... G06F 40/30
11,922,126 B1 * 3/2024 Zhang ..................... G06F 40/30
11,954,102 B1 * 4/2024 Palaniappan ....... G06F 16/2237
12,136,413 B1 * 11/2024 Dingliwal ............ G10L 15/063
(Continued)

FOREIGN PATENT DOCUMENTS

WO 2021248868 A1 12/2021

OTHER PUBLICATIONS

Hsieh et al., "Distilling Step-by-Step! Outperforming Larger Language Models with Less Training Data and Smaller Model Sizes", Findings of the Association for Computational Linguistics: ACL 2023, Jul. 9-14, 2023, Toronto, Canada, pp. 8003-8017. (Year: 2023).*
(Continued)

*Primary Examiner* — Anne L Thomas-Homescu
(74) *Attorney, Agent, or Firm* — BCF LLP

(57) ABSTRACT

A method and an apparatus for transferring knowledge from a Large Language Model (LLM) to a Small Language Model (SLM) are provided. The method comprises: iteratively executing: acquiring a client input including: (i) an task for the SLM, (ii) a plurality of data samples responsive to the task, and (iii) an indication of the SLM; generating, using the LLM, a plurality of training samples for the SLM based on client input; training the SLM based on the plurality of training samples to execute the task, thereby generating a first trained SLM; generating, using the LLM, a plurality of validation samples for the first trained SLM; generating an augmented plurality of data samples including the plurality
(Continued)

of data samples and at least one target validation sample from the plurality of validation samples; and using the augmented plurality of data samples for training the SLM during a following training iteration.

20 Claims, 7 Drawing Sheets

(56) References Cited

U.S. PATENT DOCUMENTS

| | | | | |
|---|---|---|---|---|
| 12,175,966 | B1 * | 12/2024 | Lai | G10L 15/183 |
| 2020/0251091 | A1 * | 8/2020 | Zhao | G06N 5/022 |
| 2021/0224660 | A1 * | 7/2021 | Song | G06N 3/045 |
| 2021/0342544 | A1 * | 11/2021 | Galle | G06N 3/045 |
| 2022/0067274 | A1 | 3/2022 | Wang et al. | |
| 2022/0067283 | A1 * | 3/2022 | Bellegarda | G06N 3/045 |
| 2023/0014775 | A1 * | 1/2023 | Dotan-Cohen | H04L 51/046 |
| 2023/0135179 | A1 * | 5/2023 | Mielke | G06N 5/022 704/232 |
| 2023/0141398 | A1 * | 5/2023 | Bahdanau | G06F 40/30 704/9 |
| 2023/0169147 | A1 * | 6/2023 | Sivakumar | G06N 5/02 382/159 |
| 2024/0070394 | A1 * | 2/2024 | Peng | G06F 40/40 |
| 2024/0126576 | A1 * | 4/2024 | Bent, III | G06F 9/453 |
| 2024/0126997 | A1 * | 4/2024 | Bent, III | G06N 20/00 |
| 2024/0135187 | A1 * | 4/2024 | Srinivasan | G06N 3/0455 |
| 2024/0185001 | A1 * | 6/2024 | Nagaraju | G06F 40/284 |
| 2024/0346254 | A1 * | 10/2024 | Liu | G06F 40/40 |
| 2024/0378400 | A1 * | 11/2024 | Zhang | G06F 40/40 |
| 2024/0403560 | A1 * | 12/2024 | Radu | G06F 40/284 |
| 2024/0404514 | A1 * | 12/2024 | Rollwage | A61B 5/4803 |
| 2025/0060944 | A1 * | 2/2025 | Radhakrishna | G06F 40/35 |
| 2025/0077625 | A1 * | 3/2025 | Coleman | G06F 16/23 |
| 2025/0094233 | A1 * | 3/2025 | Meng | G06N 3/045 |
| 2025/0147991 | A1 * | 5/2025 | Zang | G06F 16/31 |
| 2025/0156638 | A1 * | 5/2025 | Shen | G06F 40/30 |
| 2025/0209282 | A1 * | 6/2025 | Liu | G06F 16/35 |

OTHER PUBLICATIONS

Taori et al., "Alpaca: A Strong, Replicable Instruction-Following Model", 2023, retrieved from https://crfm.stanford.edu/2023/03/13/alpaca.html on Jul. 21, 2023.

Shumailov et al., "The Curse of Recursion: Training on Generated Data Makes Models Forget", May 31, 2023, arXiv:2305.17493v2.

Agarwal et al., "GKD: Generalized Knowledge Distillation for Auto-regressive Sequence Models", Jun. 23, 2023, arXiv:2306.13649v1.

Hsieh et al., "Distilling Step-by-Step! Outperforming Larger Language Models with Less Training Data and Smaller Model Sizes", Findings of the Association for Computational Linguistics: ACL 2023, Jul. 9-14, 2023, Toronto, Canada, pp. 8003-8017.

Gudibande et al., "The False Promise of Imitating Proprietary LLMs", May 25, 2023, arXiv:2305.15717v1.

Wu et al., "LaMini-LM: A Diverse Herd of Distilled Models from Large-Scale Instructions", May 24, 2023, arXiv:2304.14402v2.

Gu et al., "Knowledge Distillation of Large Language Models", Jun. 14, 2023, arXiv:2306.08543v1.

Ye et al., "ProGen: Progressive Zero-shot Dataset Generation via In-context Feedback", Findings of the Association for Computational Linguistics: EMNLP 2022, Dec. 7-11, 2022, pp. 3671-3683.

Ye et al., "ZEROGEN: Efficient Zero-shot Learning via Dataset Generation", EMNLP 2022, Oct. 22, 2022, arXiv:2202.07922v2.

Chiang et al., "Vicuna: An Open-Source Chatbot Impressing GPT-4 with 90%* ChatGPT Quality", retrieved from https://lmsys.org/blog/2023-03-30-vicuna/ on Jul. 21, 2023.

Wu et al., "Multi-Level Knowledge Distillation for Out-of-Distribution Detection in Text", Proceedings of the 61st Annual Meeting of the Association for Computational Linguistics, vol. 1: Long Papers, Jul. 9-14, 2023, pp. 7317-7332.

Fang et al., "Mosaicking to Distill: Knowledge Distillation from Out-of-Domain Data", 35th Conference on Neural Information Processing Systems (NeurIPS 2021), Dec. 6-14, 2021.

* cited by examiner

METHODS AND SYSTEMS FOR TRANSFERRING KNOWLEDGE FROM LARGE LANGUAGE MODELS TO SMALL LANGUAGE MODELS USING OUT-OF-DISTRIBUTION FEEDBACKS

FIELD

The present technology relates generally to machine learning, and specifically, to methods and systems for knowledge distillation from large language models (LLMs) to small language models (SLMs) using out-of-distribution feedbacks.

BACKGROUND

Large language models (LLMs) are advanced artificial intelligence systems that use deep learning techniques to understand and generate human language. They are trained on massive amounts of text data and can perform a wide range of natural language processing tasks, such as text generation, translation, sentiment analysis, and more. These models, like GPT-3, for example, have the ability to understand context, generate coherent and contextually relevant text, and can be fine-tuned for specific applications. They have gained popularity for their potential in various industries, including customer service, content generation, and language translation, among others.

LLMs have demonstrated few-shot abilities, their enormous size makes them expensive and difficult to deploy in many situations. For example, hosting a single 175 billion parameter LLM (such as GPT3.5, for instance) may require up to 350 GB GPU memory using specialized infrastructure. Such computational requirements are expensive, especially for applications that require low latency performance.

One way to remedy this challenge is to deploy comparatively smaller and specialized models in lieu of LLMs. Sometimes referred to herein as "Small Language Models" (SLMs), these models can be trained using at least one of the following paradigms: finetuning or knowledge distillation. For example, during finetuning, a pretrained smaller model (e.g., BERT or T5) is updated using downstream human annotated data. In another example, during knowledge distillation a smaller model is trained using "knowledge" (e.g., labels) obtained from an LLM. To achieve comparable performance to LLMs, finetuning requires human labels that can be expensive to obtain.

Knowledge distillation methods can be categories into two following categories: "data-informed" knowledge distillation and "data-free" knowledge distillation. The data-informed knowledge distillation methods use LLMs to label unlabeled real data, while dataset-free methods use LLMs to generate synthetic data and the corresponding labels.

In an article entitled "ZeroGen: Efficient Zero-shot Learning via Dataset Generation," authored by Ye et al., and published by University of Hong Kong on Feb. 16, 2022, there is proposed knowledge distillation from LLMs with zero real data via dataset generation. Their experiments show training SLMs with the synthetic data generated by LLMs can perform as well as SLMs trained with real data. However, LLMs are prone to generating low-quality data.

In order to address this limitation, in an article entitled "ProGen: Progressive Zero-shot Dataset Generation via In-context Feedback," authored by Ye et al., and published by University of Hong Kong on Oct. 22, 2022, there is proposed finding "important" examples during data generation by measuring the influence of each example in lowering the validation error. ProGen solution uses LLMs to generate a synthetic validation set at first and uses that in the course of data generation to measure the value of each sample. However, a validation set is not guaranteed to represent the distribution of real data.

In an article entitled "Self-Guided Noise-Free Data Generation for Efficient Zero-Shot Learning," authored by Gao et al., and published as a paper of International Conference on Learning Representations in February 2023, there is proposed knowledge distillation from LLMs via synthetic data generation by LLMs. In this paper, a noise-robust re-weighting framework is proposed to automatically construct high-quality data for zero-shot classification problems. This framework features the ability to learn the sample weights indicating data quality without requiring any human annotation.

In an article entitled "Distilling Step-by-Step! Outperforming Larger Language Models with Less Training Data and Smaller Model Sizes," authored by Hseih et al., and published by Association for Computational Linguistics in July 2023, there is proposed knowledge distillation from LLMs via annotating real data by LLMs. Distilling step-by-step proposes a new mechanism that (a) trains smaller models that outperform LLMs, and (b) achieves so by leveraging less training data needed by finetuning or distillation. The method described in the article extracts LLM rationales as additional supervision for small models within a multi-task training framework. In the article, it is demonstrated that training SLM on the labels and rationales generated by LLMs improves previous work that train SLMs with only labels generated by LLMs.

In an article entitled "Knowledge Distillation of Large Language Models," authored by Gu et al., and published at arxiv.org in June 2023, there is disclosed distillation of smaller language models from generative larger language models. The article proposes to replace the forward Kullback-Leibler divergence (KLD) objective in the standard KD approaches with reverse KLD, which is more suitable for KD on generative language models, to prevent the student model from overestimating the low-probability regions of the teacher distribution. Then, an effective optimization approach is derived to learn this objective.

In an article entitled "Generalized Knowledge Distillation for Auto-regressive Language Models," authored by Agarwal et al., and published at arxiv.org in June 2023, there is disclosed a Generalized Knowledge Distillation (GKD) approach, including instead of solely relying on a fixed set of output sequences, training the student on its self-generated output sequences by leveraging feedback from the teacher on such sequences. Unlike supervised KD approaches, GKD also appears to offer the flexibility to employ alternative loss functions between the student and teacher, which can be useful when the student lacks the expressivity to mimic the teacher's distribution.

In an article entitled "LaMini-LM: A Diverse Herd of Distilled Models from Large-Scale Instructions," authored by Wu et al., and published at arxiv.org in April 2023, there is disclosed distilling knowledge from instruction-tuned LLMs into much smaller ones. To this end, a large set of 2.58M instructions based on both existing and newly-generated instructions has been developed. In addition to being sizable, the instructions to cover a broad set of topics to ensure diversity have been designed. Leveraging these instructions, a diverse herd of models are fine-tuned. These models are collectively referred to as LaMini-LM, which includes models from both the encoder-decoder and decoder-only families, with varying sizes.

An international Patent Application No.: WO 2021/248,868-A1, published on Dec. 16, 2021, assigned to ZHEJIANG LAB, and entitled "KNOWLEDGE DISTILLATION-BASED COMPRESSION METHOD FOR PRE-TRAINED LANGUAGE MODEL, AND PLATFORM," discloses a knowledge distillation-based compression method for a pre-trained language model, and a platform. In this method, a universal feature transfer knowledge distillation strategy is first designed, and in a process of distilling knowledge from a teacher model to a student model, feature maps of each layer of the student model are approximated to features of the teacher model, with emphasis on the feature expression capacity in intermediate layers of the teacher model for small samples, and these features are used to guide the student model; then, the ability of the self-attention distribution of the teacher model to detect semantics and syntax between words is used to construct a knowledge distillation method based on self-attention crossover; and finally, in order to improve the learning quality of early-period training and the generalization ability of late-period training in the learning model, a Bernouli probability distribution-based linear transfer strategy is designed to gradually complete knowledge transfer of the feature map and self-attention distribution from the teacher to the student. Thus, in this method, automatic compression is performed on a pre-trained multi-task-oriented language model to improve language model compression efficiency.

SUMMARY

Developers have devised methods and devices for overcoming at least some drawbacks present in prior art solutions.

Developers of the present technology have realized that some known solutions are prone to model collapse in data generation. Model collapse in data generation means that the generated samples by LLMs are mainly sampled from the center of distribution and therefore the SLM may not learn the "tails" of the distribution. Therefore, the SLMs prepared based on such data are not robust and generalizable. In order to address this issue, in some embodiments of the present technology, developers have devised an approach that generates an "out-of-distribution" (OOD) validation set for the SLM, finds failure modes of the SLM and, in a sense, tries to "guide" the LLM to generate data similar to failure modes of that SLM.

Further, the present methods and systems are directed to training the SLM based on these out-of-distribution training samples, which hence allows improving robustness of the SLM to noisy data and generalizability of SLM.

Furthermore, developers of the present technology have realized that known solutions do not propose a flexible and general framework for SLM preparation that is both task-agnostic and data-free. In some embodiments of the present technology, developers have devised a framework capable of preparing SLMs without having real data, as long as the desired task is within the expertise of the LLM.

More specifically, the methods and systems described herein may allow training the SLM having the following advantages of the prior art approaches described above: (i) use of both labeled and unlabeled data for knowledge distillation; (ii) robustness to model collapse and generalizability to OOD samples; (iii) flexibility with respect to different NLP tasks; (iv) providing an automatic feedback function that does not require human intervention and guides the LLM in the procedure of data generation; (v) it is not needed to access the LLM parameters; (vi) applicability to novel NLP tasks; and (vii) different application scenarios. More specifically, certain embodiments of the described systems and methods can be applied three different scenarios: (1) a user only has a task definition of the problem and limited number of samples; (2) in addition to the inputs in scenario (1), the user has a pre-trained SLM and would like to make their SLM more generalizable and robust; and (3) in addition to the inputs in scenario (1), the user also has a validation set with human-generated labels.

For example, the user may request a given SML to complete an NLP task. In this example, the user may provide a definition for the task in natural language, a set of data samples for the task and an indication SML, such a size thereof. The NLP task may read, for example: "Predicting whether movie reviews are positive or negative". In this example, a sample of data for this task may be: "Input: Almost Christmas is a movie that has balanced all its features to make a great movie. All the characters fit their roles and make the plot come to life, Output: positive" and the indication for the model size as: "Model with less than 1B parameters.". In response, the system, in some embodiments of the present technology, may be configured to generate and/or provide the SML that can execute the user-requested task.

More specifically, in accordance with a first broad aspect of the present technology, there is provided a computer-implemented method for transferring knowledge from a Large Language Model (LLM) to a Small Language Model (SLM) for training the SLM to execute a Natural Language Processing (NLP) task. The method comprises: during a first training iteration of a plurality of training iterations: acquiring, from a user, a client input including: (i) the NLP task for the SLM, (ii) a plurality of data samples responsive to the NLP task, and (iii) an indication of the SLM; generating, using the LLM, a plurality of training samples for the SLM based on the NLP task and the plurality of data samples, the plurality of training samples being in-distribution training samples; training the SLM based on the plurality of training samples to execute the NLP task, thereby generating a first trained SLM; generating, using the LLM, a plurality of validation samples for the first trained SLM, the plurality of validation samples being out-of-distribution training samples; selecting at least one target validation sample from the plurality of validation samples based on a current prediction accuracy value of the SLM for each of the plurality of validation samples; generating an augmented plurality of data samples including the plurality of data samples and the at least one target validation sample. Further, during a second training iteration of the plurality of training iterations, following the first training iterations, the method comprises: generating, using the LLM, a second plurality of training samples for the first trained SLM based on the NLP task and the augmented plurality of data samples, in lieu of the plurality of data samples; training the first trained SLM based on the second plurality of training samples, thereby generating a second trained SLM; and causing an updated SLM, generated after the plurality of training iterations, to execute the NLP task in lieu of the LLM.

In some implementations of the method, a given data sample of the plurality of data samples includes: a given NLP query representative of the NLP task; and a respective label indicative of an NLP response to the NLP query.

In some implementations of the method, the indication of the SLM includes a desired size of the SML.

In some implementations of the method, the indication of the SLM includes the SLM itself.

In some implementations of the method, the generating the plurality of validation samples comprises submitting, to the LLM, a respective NLP query.

In some implementations of the method, the plurality of training samples is larger than the plurality of data samples.

In some implementations of the method, the selecting the at least one target validation sample comprises selecting the at least one target validation sample in response to the current prediction accuracy value of the first trained SLM for the at least one target validation sample being within a predetermined prediction accuracy range.

In some implementations of the method, the current prediction accuracy value is represented by a respective value of a loss function of the SLM on a given validation sample of the plurality of validation samples during the first training iteration.

In some implementations of the method, the LLM and the SLM are Transformer-based language models.

Further, in accordance with a second broad aspect of the present technology, there is provided a computer-implemented method for transferring knowledge from a Large Language Model (LLM) to a pre-trained Small Language Model (SLM) for training the SLM to execute a Natural Language Processing (NLP) task. The method comprises: during a first training iteration of a plurality of training iterations: acquiring, from a user, a client input including: (i) the NLP task for the pre-trained SLM, (ii) a plurality of data samples responsive to the NLP task, and (iii) the pre-trained SLM; training the pre-trained SLM to execute the NLP task based on the plurality of data samples, thereby generating a first trained SLM; identifying, in the plurality of data samples, at least one target data sample based on a current prediction accuracy value of the pre-trained SLM for each one of the plurality of data samples; generating an augmented plurality of data samples including the plurality of data samples and the at least one target data sample. Further, during a second training iteration of the plurality of fine-tuning iterations, following the first training iteration, the method comprises: generating, using the LLM, a second plurality of training samples for the first trained SLM based on the NLP task and the augmented plurality of data samples, in lieu of the plurality of data samples; training the first trained SLM based on the other plurality of training samples, thereby generating a second trained SLM; and causing a trained SLM, generated after the plurality of training iterations, to execute the NLP task in lieu of the LLM.

Further, in accordance with a third broad aspect of the present technology, there is provided an electronic device for transferring knowledge from a Large Language Model (LLM) to a Small Language Model (SLM) for training the SLM to execute a Natural Language Processing (NLP) task. The electronic device comprises at least one processor and at least one non-transitory computer-readable memory storing executable instructions, which, when executed by the at least one processor, cause the electronic device to: during a first training iteration of a plurality of training iterations: acquire, from a user, a client input including: (i) the NLP task for the SLM, (ii) a plurality of data samples responsive to the NLP task, and (iii) an indication of the SLM; generate, using the LLM, a plurality of training samples for the SLM based on the NLP task and the plurality of data samples, the plurality of training samples being in-distribution training samples; train the SLM based on the plurality of training samples to execute the NLP task, thereby generating a first trained SLM; generate, using the LLM, a plurality of validation samples for the first trained SLM, the plurality of validation samples being out-of-distribution training samples; select at least one target validation sample from the plurality of validation samples based on a current prediction accuracy value of the SLM for each of the plurality of validation samples; generate an augmented plurality of data samples including the plurality of data samples and the at least one target validation sample. Further, during a second training iteration of the plurality of training iterations, following the first training iterations, the at least one processor causes the electronic device to: generate, using the LLM, a second plurality of training samples for the first trained SLM based on the NLP task and the augmented plurality of data samples, in lieu of the plurality of data samples; train the first trained SLM based on the second plurality of training samples, thereby generating a second trained SLM; and cause an updated SLM, generated after the plurality of training iterations, to execute the NLP task in lieu of the LLM.

In some implementations of the electronic device, a given data sample of the plurality of data samples includes: a given NLP query representative of the NLP task; and a respective label indicative of an NLP response to the NLP query.

In some implementations of the electronic device, the indication of the SLM includes a desired size of the SML.

In some implementations of the electronic device, the indication of the SLM includes the SLM itself.

In some implementations of the electronic device, to generate the plurality of validation samples, the at least one processor further causes the electronic device to submit, to the LLM, a respective NLP query.

In some implementations of the electronic device, the plurality of training samples is larger than the plurality of data samples.

In some implementations of the electronic device, to select the at least one target validation sample, the at least one processor further causes to select the at least one target validation sample in response to the current prediction accuracy value of the first trained SLM for the at least one target validation sample being within a predetermined prediction accuracy range.

In some implementations of the electronic device, the current prediction accuracy value is represented by a respective value of a loss function of the SLM on a given validation sample of the plurality of validation samples during the first training iteration.

In some implementations of the electronic device, the LLM and the SLM are Transformer-based language models.

In the context of the present technology, the term "machine learning" refers to a field of study and technology that enables computers and systems to learn and improve performance based on data without being explicitly programmed. It involves the development of algorithms and models that can discover patterns and insights in datasets, allowing systems to make intelligent predictions and decisions.

In the context of the present technology, the term "Natural Language Processing (NLP)" is a subfield of machine learning that deals with the interaction between computers and human (i.e., "natural") language. It focuses on tasks such as understanding, analyzing, and generating human language, with the goal of enabling computers to derive meaning and communicate effectively in natural and conversational ways.

In the context of the present technology, the term "training dataset" refers to a labeled dataset that is used for training an algorithm or a machine learning model. It includes both input data and corresponding output data (also known as "labels" or "targets") that help the algorithm understand the relationship between the inputs and outputs. For example, an input could be an image of a cat, and the output would be the label “cat”.

In the context of the present technology, the term “validation dataset” may be a subset of the labeled dataset which may not overlap with the train set, that is used during training to evaluate model’s performance.

In the context of the present technology, the term “real data” refers to a dataset collected and labeled by humans.

In the context of the present technology, the term “synthetic data” refers to artificially created datasets that mimic real data samples. It is generated using various statistical methods or techniques, often intended to preserve the statistical characteristics, patterns, and distributions of real data.

In the context of the present technology, the term “pre-trained model” refers to a model that has been trained on a large dataset in advance. It has already learned features and patterns from the dataset and can be directly used for specific tasks without any further training.

In the context of the present technology, the term “fine-tuning” refers to the process of taking a pre-trained model and further training it on new data to improve its performance on a specific task.

In the context of the present technology, the term “language model” refers to a computational model that learns patterns and relationships in a given text dataset to predict or generate coherent and meaningful sequences of words or characters. It aims to understand the structure and meaning of written or spoken language to perform tasks such as machine translation, speech recognition, and natural language understanding.

In the context of the present technology, a given LLM may be characterized by its comparatively large size which usually contain a large number of weights (i.e., more than 10^9). Notable examples include OpenAI’s GPT models (e.g., GPT-3.5 and GPT-4, used in ChatGPT), Google’s PaLM (used in Bard), and Meta’s LLaMa, as well as BLOOM, Ernie 3.0 Titan, and Claude.

In the context of the present technology, an SLM is relatively simple and has a smaller number of parameters compared to larger models. SLMs are used to perform natural language processing tasks, such as language generation, sentiment analysis, or machine translation, albeit with limited capabilities due to their smaller size. Despite their limitations, small language models can be more computationally efficient for certain applications that don’t require a high level of complexity.

In the context of the present technology, the term “generative model” is a type of statistical model that can generate new data instances.

In the context of the present technology, the term “prompt” refers to an initial natural language input or instruction given to the model to guide its generation of output. It can be a few words, a sentence, or a paragraph, specifying the topic or format required for the generated text. The model then responds based on the provided prompt to produce relevant and coherent output.

In the context of the present technology, the term “knowledge distillation” denotes a technique used to transfer knowledge from a large, complex model (the “teacher” model) to a smaller, simpler model (the “student” model). The goal is to create a smaller model that can perform as well as the larger model while being more efficient and easier to deploy.

In the context of the present technology, the term “teacher model” refers to a larger, more complex model that has been trained on a large dataset. The teacher model is typically used to label data for a smaller model. The student model, on the other hand, is a smaller, less complex model that is trained to mimic the behavior of the teacher model. The student model learns from the teacher model by leveraging its knowledge to achieve similar accuracy.

In the context of the present specification, the term “training data distribution” refers to a distribution of training samples (or otherwise, training digital objects) in a given multidimensional space defined by features of these training examples. For example, for training samples representative of movie reviews, the features defining the respective multidimensional space can be, without limitation, a genre of a given movie, a style of writing of a given reviewer, countries where the given movie has been produced, a release year of the given movie, etc.

In the context of the present technology, the term “out-of-distribution (OOD) data” refers to training data that is outside a predetermined width (such as 3 standard deviation values, for example) of the training data distribution. In other words, it is data that a given model has not seen before and may not be able to accurately predict. For example, OOD samples may refer to training samples around “tails” of the training data distribution and/or outside thereof, but within the test and validation data distributions.

In the context of the present technology, the term “in-distribution (IND) data” refers to the set of training samples that is within the predetermined width of the training data distribution. This means the sample data is drawn from the same underlying population as the training data, and the model can make accurate predictions on such examples.

In the context of the present specification, the term “Energy Function” refers to an algorithm for identifying OOD samples generated by machine learning models. The Energy Function can be flexibly used as a scoring function for a pre-trained neural network-based classifier, as well as a trainable cost function to explicitly shape the energy surface for OOD detection.

In the context of the present technology, the term “generalization” refers to the model’s ability to adapt properly to new, previously unseen data, drawn from the same distribution as the one used to train and evaluate the model.

In the context of the present technology, the term “few-shot learning” refers to the ability of these models to learn to perform a task with very few examples. It allows LLMs to adapt quickly to new tasks and project-specific phenomena, such as identifier names, APIs, terminology, and coding patterns.

In the context of the present technology, the term “iteration” refers to a single update of the model’s parameters during the training process. During an iteration, the model processes a batch of data, computes the loss or error, and updates its parameters based on the computed gradients.

In the context of the present technology, the term “epoch” refers to one complete pass through the entire training dataset during the training process of a machine learning model. During an epoch, the model processes each example in the training dataset and updates its internal parameters to reduce the error between its predictions and the ground truth.

In the context of the present technology, the term “distribution” is a mathematical function, called a “the probability density function” in the continuous case and a “the probability mass function” in the discrete case, that describes the probability of occurrence of different possible outcomes in a sample space. It provides a parameterized mathematical function (such as a Gaussian distribution, parameterized by the mean and variance, for example) that can be used to calculate the probability that an individual observation falls within a region of the sample space.

In the context of the present technology, the term "tails of a distributions" of a data are sample with low probability to be observed in a dataset. Performance of a machine learning model on such samples shows its generalizability and robustness.

In the context of the present technology, the term "model collapse" occurs when the generative model produces only a limited set of outputs instead of exploring the entire distribution of the training data. In other words, the generator becomes stuck in a particular mode or pattern, failing to generate diverse outputs that cover the entire range of the data. This can result in the generated output appearing repetitive, lacking in variety and detail, and sometimes even being completely unrelated to the training data.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
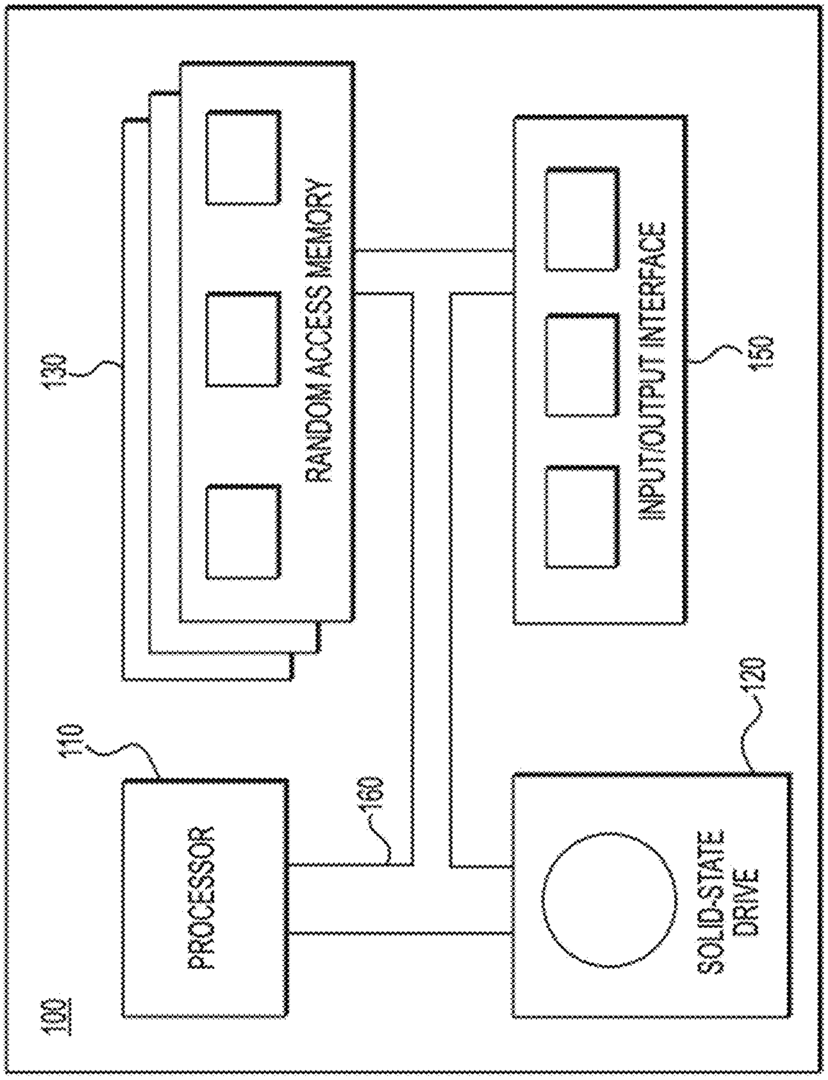
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Computing Device

FIG. 1 illustrates a diagram of a computing device 100 in accordance with an embodiment of the present technology is shown. In some embodiments, the computing device 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing device 100 comprises various hardware components including one or more single or multi-core processors collectively represented by a processor 110, a solid-state drive 120, a random-access memory 130 and an input/output interface 150.

In some embodiments, the computing device 100 may also be a sub-system of one of the above-listed systems. In some other embodiments, the computing device 100 may be an "off the shelf" generic computer system. In some embodiments, the computing device 100 may also be distributed amongst multiple systems. The computing device 100 may also be specifically dedicated to the implementation of the present technology. As a person in the art of the present technology may appreciate, multiple variations as to how the computing device 100 is implemented may be envisioned without departing from the scope of the present technology.

Communication between the various components of the computing device 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random-access memory 130 and executed by the processor 110 for executing operating data centers based on a generated machine learning pipeline. For example, the program instructions may be part of a library or an application.

In some embodiments of the present technology, the computing device 100 may be implemented as part of a cloud computing device. Broadly, a cloud computing device is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing devices can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing devices offer a range of benefits, including cost savings, scalability, increased agility, and the ability to quickly deploy and manage applications.

First Implementation of Knowledge Transferring Framework

Figure 2A:
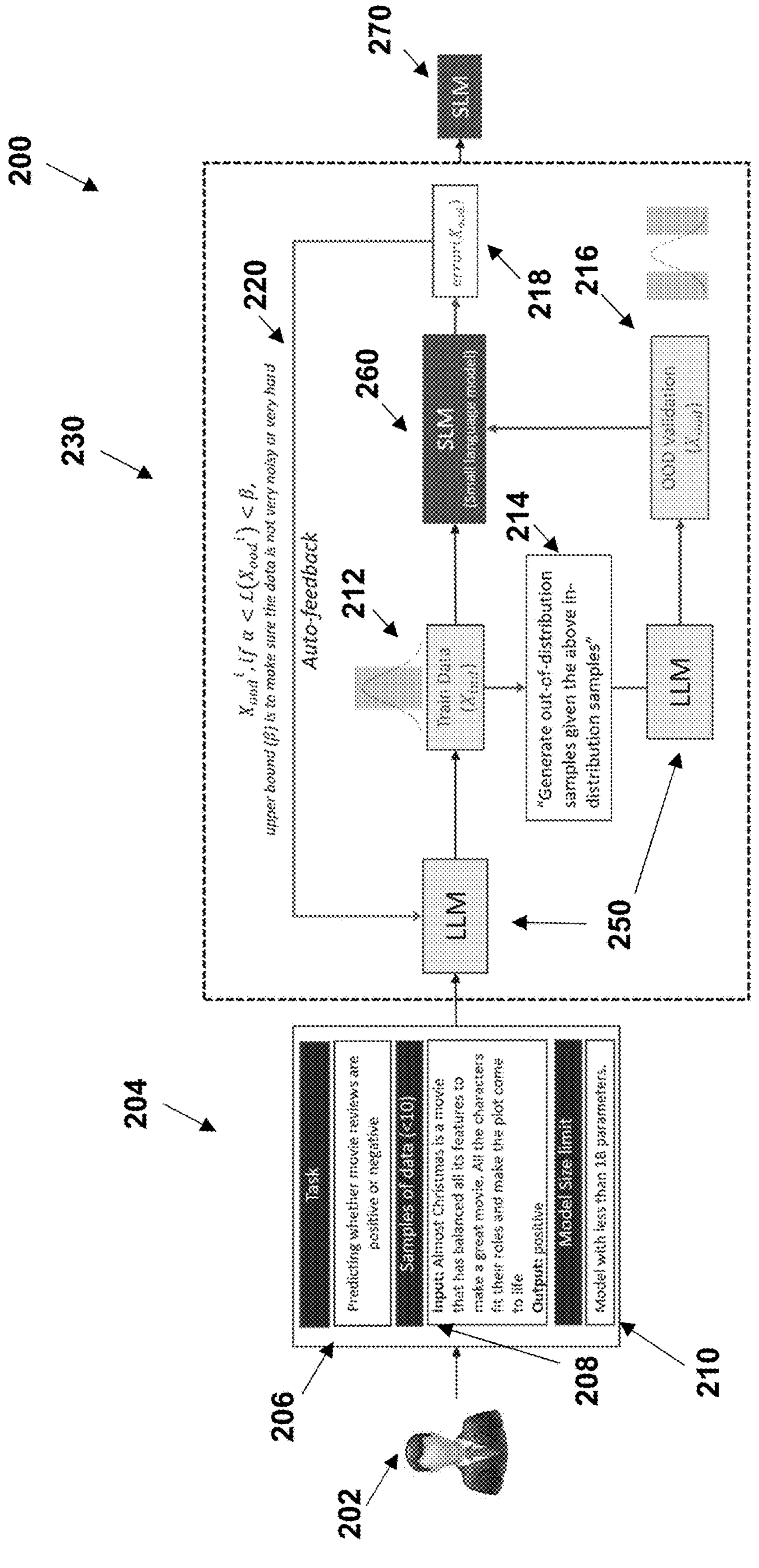
FIG. 2A is a schematic representation of a first training iteration for training a small language model (SLM) executed by the computing device of FIG. 1 in accordance with a first non-limiting embodiment of the present technology.

With reference to FIG. 2A, there is depicted a schematic representation of a system 200 executing a first training iteration 230 of a knowledge transferring framework, in accordance with first non-limiting embodiments of the present technology. The system 200 may include some or all component of the computing device 100. The system 200 may be configured to use an LLM 250 to train an SLM 260 for obtaining an updated SLM 270.

According to certain non-limiting embodiments of the present technology, the system 200 may be configured to acquire a user input 204 from a user 202. In this embodiment, the user input 204 comprises a task definition 206; a data samples 208; and an SLM indication 210.

In some non-limiting embodiments of the present technology, a given data sample of the data samples 208 comprises a given query corresponding to the task definition 206 of a given NLP task and a label including an indication of a respective response to the given query. In some non-limiting embodiments of the present technology, the SLM indication 210 can comprise a user-specified size of the SLM 260, such as less than 1 billion parameters. In other non-limiting embodiments of the present technology, as will become apparent from the description provided below, the SLM indication can comprise the SLM 260 itself. The processor 110 may use the user input 204 to automatically prepare a prompt for the LLM 250.

According to certain non-limiting embodiments of the present technology, the processor 110 is configured to use the LLM 250 to generate a first plurality of training samples ($X_{ind}$) that are in-distribution (IND) training samples. The processor 110 may be configured to use the first plurality of training samples 212 $X_{ind}$ to train (update weights of) the SLM 260 during the first training iteration to generate a first trained SLM 260' depicted in FIG. 2C.

Further, according to certain non-limiting embodiments of the present technology, given the first plurality of training samples 212 are IND training samples, the processor 110 of the computing device 100 can be configured to generate a prompt 214 for submission to the LLM 250 to generate a first plurality of validation samples 216 $X_{ood}$ that are out-of-distribution (OOD) training samples.

According to certain non-limiting embodiments of the present technology, the processor 110 can be configured to determine whether a given training sample is one of an IND and OOD training sample using an Energy Function. More specifically, the processor 110 can be configured to: (i) generate, for the given training sample, using the Energy Function, a respective energy score; and (ii) determine, based on the respective energy score, whether the given training sample is one of an IND and OOD training sample.

It is contemplated that the data samples 208 from the user 202 may also be used in the prompt 214 to generate the first plurality of validation samples 216 $X_{ood}$. This means that the first plurality of validation samples 216 $X_{ood}$ are also conditioned on the real examples from the user 202. The processor 110 may be configured to use the first plurality of validation samples 216 $X_{ood}$ as the validation set for the SLM 260. The processor 110 is configured to determine a validation loss function 218 $\mathcal{L}(X_{ood}^{i})$ on all the first plurality of validation samples 216 $X_{ood}$ where i is a number. According to certain non-limiting embodiments of the present technology, the validation loss function 218 can include one of: a cross-entropy loss function, a symmetric cross entropy loss function, a reverse cross entropy loss function, and an energy function.

Figure 2B:
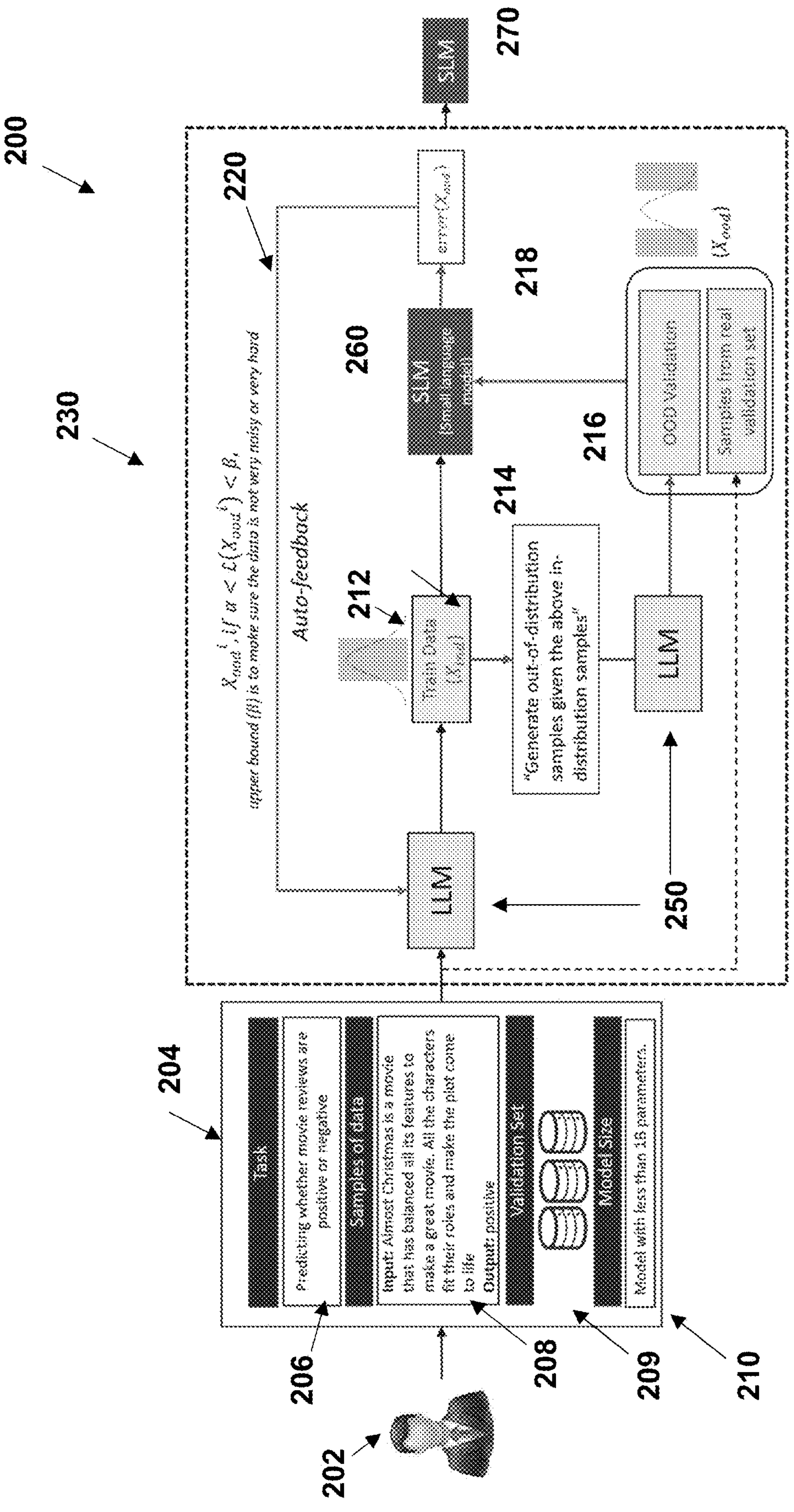
FIG. 2B is a schematic representation of a first training iteration for training the SLM executed by the computing device of FIG. 1 in accordance with a second non-limiting embodiment of the present technology.

With reference to FIG. 2B, there is depicted a schematic representation of the system 200 executing the first training iteration 230 of the knowledge transferring framework, in accordance with second non-limiting embodiments of the present technology. More specifically, in these embodiments, the processor 110 can be configured to use, along with the first plurality of validations samples 216 generated by the LLM 250, a plurality of user-generated validation samples 209 provided by the user 202. In other words, in some non-limiting embodiments of the present technology, the user input 204 can further include the plurality of user-generated validation samples 209 that includes OOD samples provided by the user 202. According to certain non-limiting embodiments of the present technology, the plurality of user-generated validation samples 209 has human-generated labels, which are considered free of noise.

Thus, in some non-limiting embodiments of the present technology, the processor 110 can be configured to generate the validation set for the SLM 260 by combining the first plurality of validation samples 260 generated by the LLM 250 and the plurality of user-generated validation samples 209 provided by the user 202.

Further, according to certain non-limiting embodiments of the present technology, the processor 110 is configured to: (i) determine for each validation sample of the validation set, a respective value of a validation loss function 218; and (ii) select, from the validation set, based on the respective values of the validation loss function 218, at least one target sample as a feedback sample 220 for the LLM 250 in a next, second, training iteration 230' (schematically represented in FIG. 2C). More specifically, according to certain non-limiting embodiments of the present technology, the processor 110 can be configured to select the feedback sample 220 if the respective value of the validation loss function 218 thereof is within a predetermined range of values. In other word, the processor 110 can be configured to select, from the validation set, the feedback sample 220 $X_{fb}$:$X_{ood}^{i}$, if $\alpha<\mathcal{L}(X_{ood}^{i})<\beta$, where $\alpha$ and $\beta$ are constant terms. It should be noted that $\alpha<\mathcal{L}(X_{ood}^{i})$ selects samples with large validation loss which may correspond to samples that the SLM 260 has not learned yet. It should also be noted that $\mathcal{L}(X_{ood}^{i})<\#\beta$ eliminates samples with very large errors which may correspond to noisy samples. It is contemplated that one or more selected samples may be used as feedback samples to LLM 250 which in a sense "guide" the LLM 250 in the next training iteration of knowledge transferring.

Figure 2C:
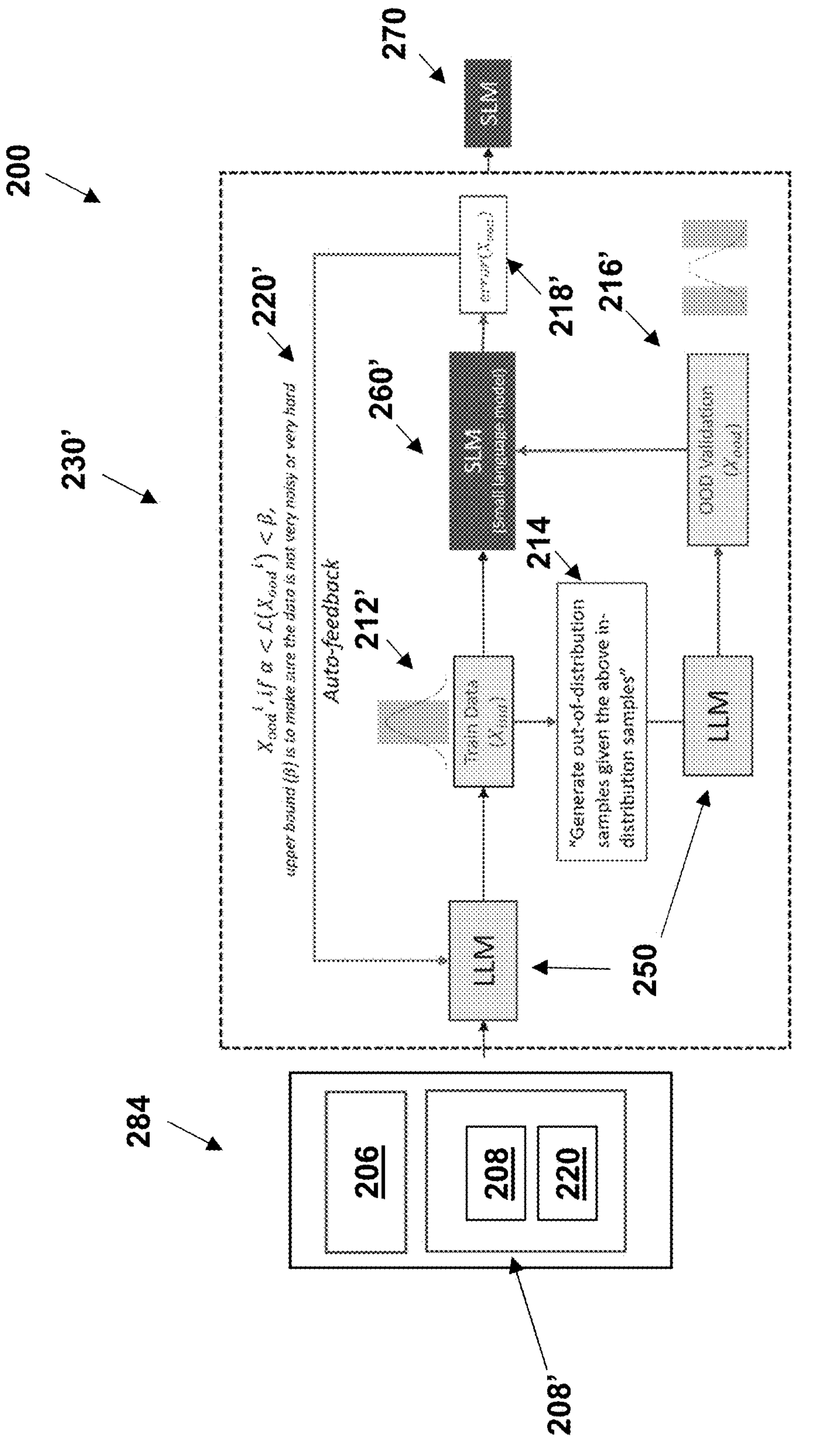
FIG. 2C is a schematic representation of a second training iteration for training the SLM executed by the computing device of FIG. 1 in accordance with the first non-limiting embodiment of the present technology.

With reference to FIG. 2C, there is depicted a schematic representation of a second training iteration 230' of the SLM 260, following the first training iteration 230, according to certain non-limiting embodiments of the present technology.

As it can be appreciated from FIG. 2C, during the second training iteration 230', the processor 110 of the system 200 can be configured to generate an augmented user input 284 based on the data samples 208 and the feedback sample 220 generated during the first training iteration 230.

In other words, during the current iteration, the augmented data samples 208' are conditioned on the feedback sample 220 from the previous iteration. Similarly, using the LLM 250, the processor 110 can be configured to generate a second plurality of training samples 212' for training the first trained SLM 260', thereby generating a second trained SLM (not depicted). By doing so, in the second training iteration 230', the LLM 250 tries to generate training samples that are similar to the feedback samples 220 $X_{fb}$. Since the feedback sample 220 was a failure case of the SLM 260, the first trained SLM 260' in the second training iteration 230' will be robust to the failure modes of the previous iteration. During the procedure of data generation and training the first trained SLM 260', akin to how it was implemented during the first training iteration 230, the processor 110 can be configured to generate a second validation set that can include a second plurality of validation samples 216' generated by the LLM 250. Similarly, in other non-limiting embodiments of the present technology, the second validation set can further include the plurality of user-generated validation samples 209 provided by the user 202.

Further, in some non-limiting embodiments of the present technology, the processor 110 can be configured to determine for each validation sample of the second validation set, a respective value of the validation loss function 218 $\mathcal{L}(X_{ood})$. As it may be appreciated, the respective values of the validation loss function 218 during the second training iteration 230' may be smaller than those in the first training iteration 230, since the first trained SLM 260' is more robust to model collapse than the SLM 260, prior to the training. Further, similarly, the processor 110 can be configured to select a second feedback sample 220' to use for generating a second augmented user input (not depicted) to train the second trained SLM (not depicted) during a third training iteration (not depicted).

Thus, the processor 110 can be configured to consecutively execute a plurality of training iterations, such as the first and second training iterations 230, 230' until the LLM 250 does not generate OOD samples that the currently trained SLM has not learned. As a result of executing the plurality of training iterations, the processor 110 can be configured to generate the updated SLM 270 for further use, instead of the LLM 250, in executing tasks according to the task definition 206 of the user input 204 initially obtained from the user 202 for training the SLM 260. In other words, instead of using the LLM 250, the user 202 is enabled to use the updated SLM 270 for executing the tasks (or otherwise, submit in-use task queries and receive responses thereto) in accordance with task definition provided by the user 202.

Second Implementation of Knowledge Transferring Framework

In some non-limiting embodiments of the present technology, the processor 110 can be configured to train a given SLM for better robustness to model collapse and generalizability without the use of the validation sets as mentioned above with reference to FIGS. 2A to 2C.

Figure 3:
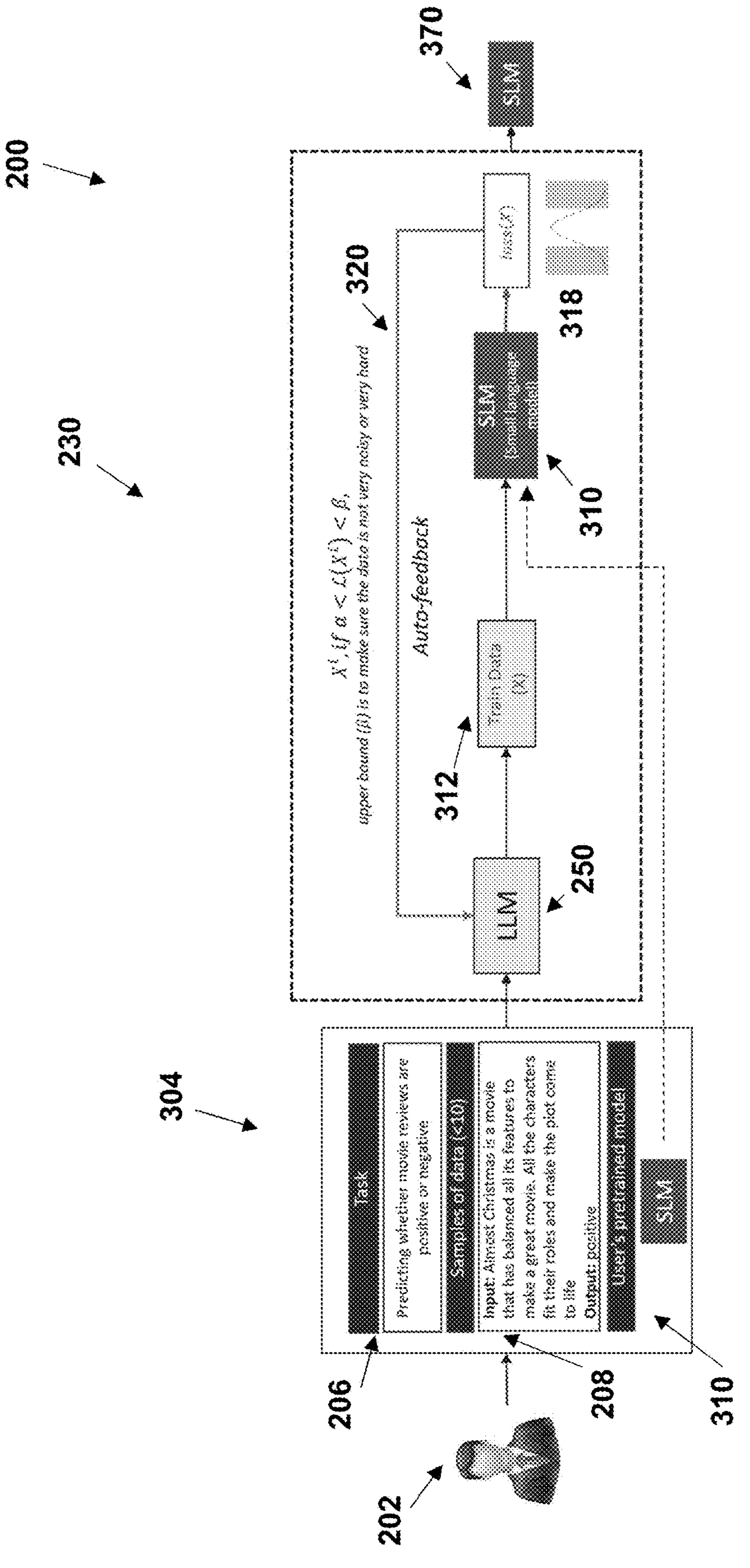
FIG. 3 is a schematic representation of a first training iteration for training a pre-trained SLM executed by the computing device of FIG. 1 in accordance with a third non-limiting embodiment of the present technology.

With reference to FIG. 3, there is depicted a schematic representation of the system 200 executing the first training iteration 230 of the knowledge transferring framework, in accordance with third non-limiting embodiments of the present technology. As it can be appreciated, in these embodiments, a second user input 304, provided by the user 202, is different from the user input 204 described in the above embodiments in that the second user input 304, along with the task definition 206 and the data samples 208, further includes a pre-trained SLM 310. For example, in some non-limiting embodiments of the present technology, the pre-trained SLM 310 can comprise the updated SLM 270 generated as described above.

The objective in these embodiments is to improve the robustness and generalizability of the pre-trained SLM 310. In order to do so, the processor 110 can be configured to generate data similar to failure modes of the pre-trained SLM 310.

In this regard, according to certain non-limiting embodiments of the present technology, the processor 110 can be configured to feed, to the LLM 250, the second user input 304, thereby causing the LLM 250 to generate a third plurality of training samples 312 X. Further, the processor 110 can be configured to feed the third plurality of training samples 312 to the pre-trained SLM 310 to train the pre-trained SLM 310 to execute the tasks in accordance with the task definition 206, thereby generating a first adjusted SLM (not depicted).

Further, the processor 110 can be configured to determine, for each one of the third plurality of training samples 312, a respective value of a loss function 318 $\mathcal{L}(X)$ of the pre-trained SLM 310. According to certain non-limiting embodiments of the present technology, the loss function 318 can be implemented similar to the validation loss function 218. Further, the processor 110 can be configured on select, from the third plurality of training samples 312, at least one target training sample 320, whose respective values of the loss function 318 are within a predetermined range of values. In other words, the processor 110 can be configured to select the at least one target training sample 320 that satisfies the following inequality: $X^{i}$, if $\alpha\,\mathcal{L}(X^{i})<\beta$, where $\alpha$ and $\beta$ are predetermined constant values.

Further, for executing the second training iteration 230', according to certain non-limiting embodiments of the present technology, the processor 110 can be configured to generate a second augmented user input (not depicted) including: (i) the data samples 208 from the second user input 304; and (ii) the at least one target training sample 320. Thus, after executing the plurality of training iterations, the processor 110 can be configured to generate a second updated SLM 370.

Thus, in these embodiments, the processor 110 is configured to select target training samples that maximize the loss of the pre-trained SLM 310 and feed them back to the LLM 250. The pre-trained SLM 310 then learns these samples. During the training, the LLM 250 is caused to generate harder examples, which may help improve the generalizability and robustness to collapse of the second updated SLM 370.

Thus, various non-limiting embodiments of the present technology allow generating an SLM, such as one of the updated and second updated SLMs 270, 370 that have the following features: (1) accuracy comparable to that of an SLM trained in human-labelled training data; (2) can be trained without human-labeled training data; (3) not requiring human feedback; (4) applicable to various NLP tasks; (4) robustness to collapse.

Also, although the embodiments described above are directed to the knowledge transferring pipeline for training the given SLM to execute various NLP tasks, it should be expressly understood that the training approaches described above can also be applied, mutatis mutandis, to training the given SLM to execute other tasks, such as image classification tasks. As an example, an image generative model, such as a Mid-journey image generative model, can be used to generate dataset for a specific image classification task to be executed by a smaller image classification model. The generated data can be used to train a user-specific image classification model, as described above, for example, with reference to FIGS. 2A to 2C. Also, for improved robustness of pre-trained image classification model, it can be trained similar to how it is described above with reference to FIG. 3 with respect to the second updated SLM 370. For example, the Mid-journey image generative model can be used to generate OOD samples for a pre-trained image classification model and use the OOD samples to fine-tune the pre-trained model.

Computer-Implemented Methods

Figure 4:
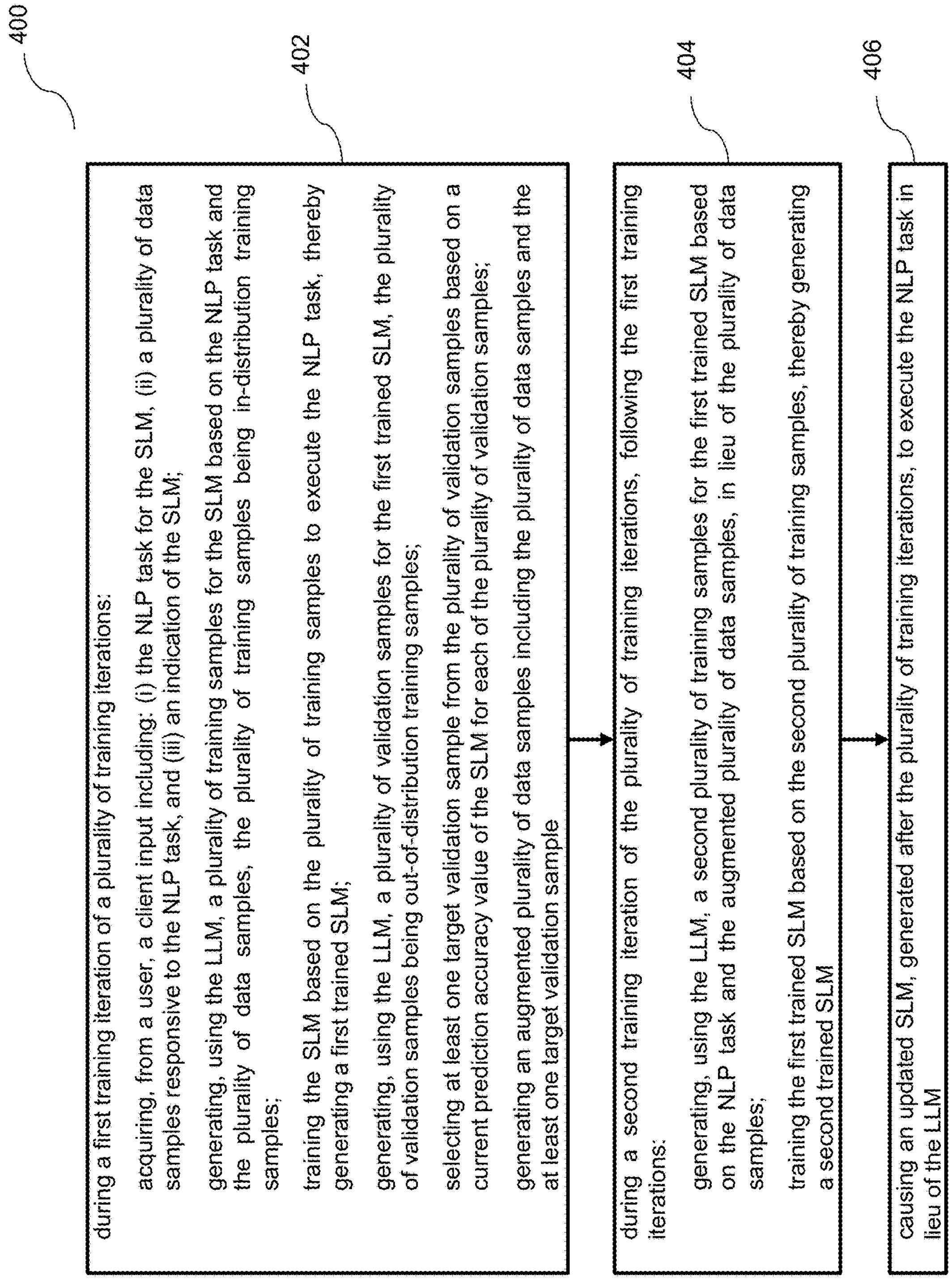
FIG. 4 is a flowchart of a first method, executed by a processor of the computing device of FIG. 1, for training the SLM of FIGS. 2A to 2C, in accordance with at least some non-limiting embodiments of the present technology.

Given the architecture and examples described above, it is now possible to execute a method for transferring knowledge from a Large Language Model (LLM) to a Small Language Model (SLM), such as from LLM 250 to the SLM 260. With reference to FIG. 4, there is depicted a flowchart diagram of a first method 400. The first method 400 can be executed by the processor 110 of the computing device 100.

Step 402: During a First Training Iteration of a Plurality of Training Iterations: Acquiring, from a User, a Client Input Including: (I) the NLP Task for the SLM, (II) a Plurality of Data Samples Responsive to the NLP Task, and (III) an Indication of the SLM; Generating, Using the LLM, a Plurality of Training Samples for the SLM Based on the NLP Task and the Plurality of Data Samples, the Plurality of Training Samples being In-Distribution Training Samples; Training the SLM Based on the Plurality of Training Samples to Execute the NLP Task, Thereby Generating a First Trained SLM; Generating, Using the LLM, a Plurality of Validation Samples for the First Trained SLM, the Plurality of Validation Samples being Out-of-Distribution Training Samples; Selecting at Least One Target Validation Sample from the Plurality of Validation Samples Based on a Current Prediction Accuracy Value of the SLM for Each of the Plurality of Validation Samples; Generating an Augmented Plurality of Data Samples Including the Plurality of Data Samples and the at Least One Target Validation Sample According to certain non-limiting embodiments of the present technology, the first method 400 commences at step 402 with the processor 110 being configured to execute the first training iteration 230 of the knowledge transferring framework for training the SLM 260, as described in detail above with reference to FIGS. 2A and 2B.

More specifically, during the first training iteration, the processor 110 can be configured to: (i) acquire, from the user 202, the user input 204 including the task definition 206, the data samples 208, and the SLM indication 210; (ii) feed the user input 204 to the LLM 250, thereby causing the LLM 250 to generate the first plurality of training samples 212 that are IND training samples; (iii) feed first plurality of training samples 212 to the SLM 260 to train the SLM 260 to execute tasks in accordance with the task definition 206, thereby generating the first trained SLM 260'.

Further, according to certain non-limiting embodiments of the present technology, the processor 110 can be configured to generate the validation set of training samples for the SLM 260, including OOD training samples. In some non-limiting embodiments of the present technology, the validation set can include the first plurality of validation samples 216 $X_{ood}$ generated by the LLM 250, as described above with reference to FIG. 2A. To cause the LLM 250 to generate the first plurality of validation samples 216, in some non-limiting embodiments of the present technology, the processor 110, can be configured to generate, based on the user input 204, and submit to the LLM 250 the prompt 214.

In other non-limiting embodiments of the present technology, described above with reference to FIG. 2B, the validation set of training samples for the SLM 260 can further include the plurality of user-generated validation samples 209 provided by the user 202 as part of the user input 204.

Further, according to certain non-limiting embodiments of the present technology, the processor 110 is configured to: (i) feed the validation set to the SLM 260 and determine, for each validation sample of the validation set, the respective value of the validation loss function 218; (ii) select, from the validation set, based on the respective values of the validation loss function 218, at least one target sample as the feedback sample 220 for the LLM 250; and (iii) generate, based on the user input 204 and the feedback sample 220, the augmented data samples 208'.

The first method hence advances to step 404.

Step 404: During a Second Training Iteration of the Plurality of Training Iterations, Following the First Training Iterations: Generating, Using the LLM, a Second Plurality of Training Samples for the First Trained SLM Based on the NLP Task and the Augmented Plurality of Data Samples, in Lieu of the Plurality of Data Samples; Training the First Trained SLM Based on the Second Plurality of Training Samples, Thereby Generating a Second Trained SLM According to certain non-limiting embodiments of the present technology, at step 404, the processor 110 can be configured to execute the second training iteration 230' of the knowledge transferring framework for training the SLM 260, described in detail above with reference to FIG. 2C.

More specifically, during the second training iteration 230', the processor 110 can be configured to feed the augmented data samples 208' to the LLM 250, thereby causing the LLM to generate the second plurality of training samples 212'. Further, the processor 110 can be configured to feed the second plurality of training samples 212' to the first trained SLM 260' to train the first trained SLM 260' to execute the tasks in accordance with the task definition 206, thereby generating the second trained SLM (not depicted).

Similarly, during the second training iteration 230', the processor 110 can be configured to generate the second feedback sample 220' for further generating the second augmented user input (not depicted) to train the second trained SLM (not depicted) during the third training iteration (not depicted).

Thus, the processor 110 can be configured to consecutively execute the plurality of training iterations, such as the first and second training iterations 230, 230' until the LLM 250 does not generate OOD samples that the currently trained SLM has not learned. By doing so, the processor 110 can be configured to generate the updated SLM 270.

The first method 400 thus proceeds to step 406.

Step 406: Causing an Updated SLM, Generated after the Plurality of Training Iterations, to Execute the NLP Task in Lieu of the LLM At step 406, the processor 110 can be configured to use the updated SLM 270 for executing the tasks in accordance with the task definition 206 instead of the LLM 250. For example, the processor 110 can be configured to enable, via a corresponding graphical user interface, the user 202 to use the updated SLM 270 for executing the tasks. In another example, upon receiving a given in-use task in accordance with task definition 206, the processor 110 can be configured to submit the given in-use task to the updated SLM 270 instead of the LLM 250.

The first method 400 hence terminates.

Figure 5:
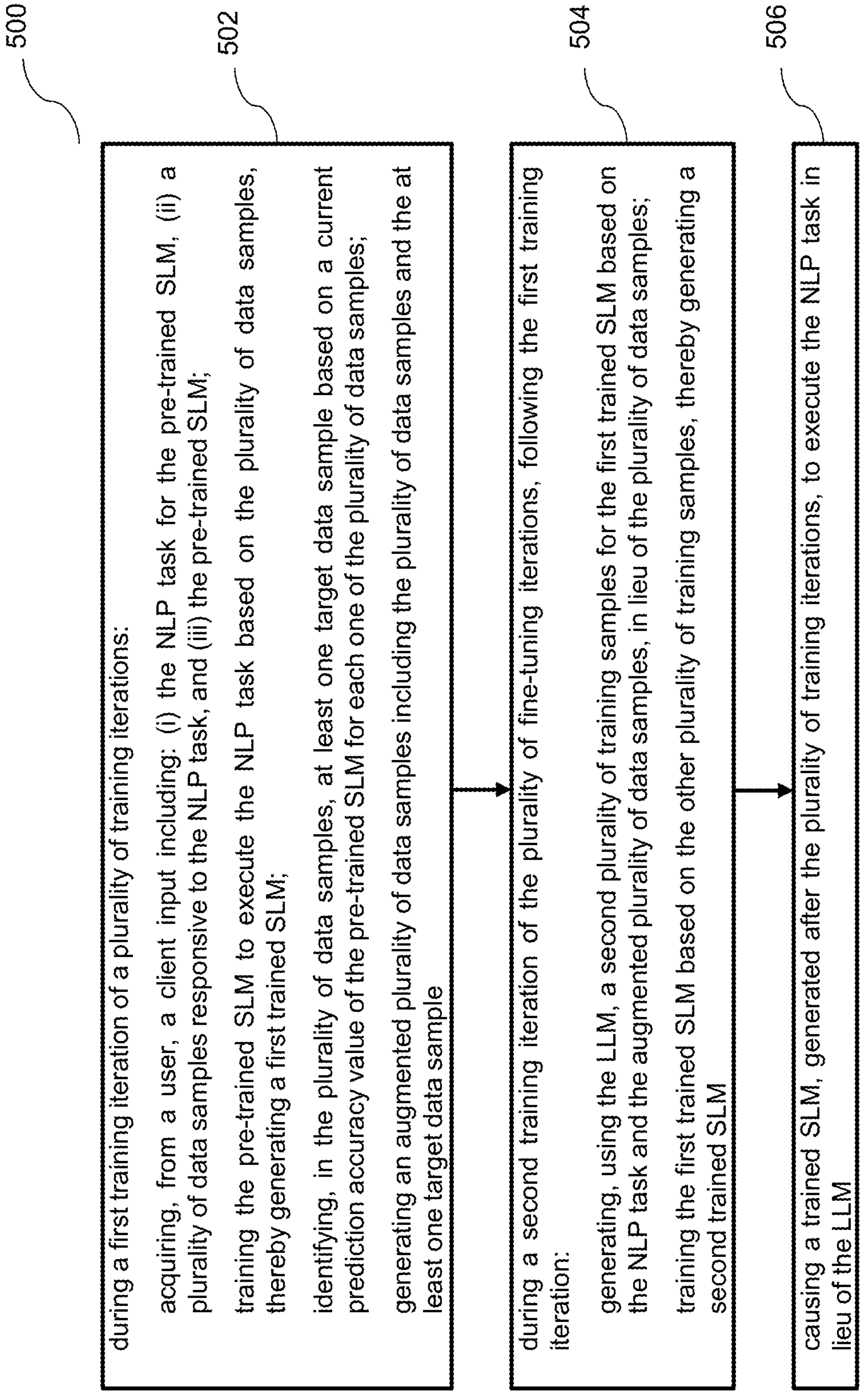
FIG. 5 is a flowchart of a second method, executed by a processor of the computing device of FIG. 1, for training the pre-trained SLM of FIG. 3, in accordance with at least some non-limiting embodiments of the present technology.

Given the architecture and examples described above, it is now possible to execute another method for transferring knowledge from a Large Language Model (LLM) to a pre-trained Small Language Model (SLM), such as from LLM 250 to the pre-trained SLM 310. With reference to FIG. 5, there is depicted a flowchart diagram of a second method 500. The second method 500 can be executed by the processor 110 of the computing device 100.

Step 502: During a First Training Iteration of a Plurality of Training Iterations: Acquiring, from a User, a Client Input Including: (I) the NLP Task for the Pre-Trained SLM, (II) a Plurality of Data Samples Responsive to the NLP Task, and (III) the Pre-Trained SLM; Training the Pre-Trained SLM to Execute the NLP Task Based on the Plurality of Data Samples, Thereby Generating a First Trained SLM; Identifying, in the Plurality of Data Samples, at Least One Target Data Sample Based on a Current Prediction Accuracy Value of the Pre-Trained SLM for Each One of the Plurality of Data Samples; Generating an Augmented Plurality of Data Samples Including the Plurality of Data Samples and the at Least One Target Data Sample The second method 500 commences at step 502 with the processor 110 being configured to execute the first training iteration 230 of the pre-trained SLM 310. More specifically, in the embodiments of step 502 of the second method 500, during the first training iteration 230, the processor 110 is configured to: (i) acquire the second user input 304 including the task definition 206, the data samples 208, and the pre-trained SLM 310; (ii) feed the second user input 304 to the LLM 250, thereby causing the LLM 250 to generate the third plurality of training samples 312; (iii) feed the third plurality of training samples 312 to the pre-trained SLM 310 to train the pre-trained SLM 310 to execute the tasks in accordance with the task definition 206, thereby generating the first adjusted SLM (not depicted).

Further, instead of validating using the validation set including the OOD samples, as describe above at step 402 of the first method 400, in these embodiments, the processor 110 can be configured to validate the pre-trained SLM 310 using those of the third plurality of training samples 312, on which the pre-trained SLM 310 has generated least accurate predictions. More specifically, according to the second method 500, the processor 110 can be configured to (i) to determine, on each one of the third plurality of training samples 312, the respective value of the loss function 318 $\mathcal{L}(X)$ of the pre-trained SLM 310; and (ii) select, from the third plurality of training samples 312, at least one target training sample 320, on which the respective values of the loss function 318 of the pre-trained SLM 310 are within the predetermined range of values.

Further, the processor 110 can be configured to generate the second augmented user input (not depicted) including: (i) the data samples 208 from the second user input 304; and (ii) the at least one target training sample 320.

The second method 500 hence advances to step 502.

Step 504: During a Second Training Iteration of the Plurality of Fine-Tuning Iterations, Following the First Training Iteration: Generating, Using the LLM, a Second Plurality of Training Samples for the First Trained SLM Based on the NLP Task and the Augmented Plurality of Data Samples, in Lieu of the Plurality of Data Samples; Training the First Trained SLM Based on the Other Plurality of Training Samples, Thereby Generating a Second Trained SLM At step 504, similar to the first training iteration 230 described at step 502, the processor 110 can be configured to use the second augmented user input to execute the second training iteration 230' of the pre-trained SLM 310, thereby generating a second adjusted SLM (not depicted).

Thus, after executing the plurality of training iterations, the processor 110 can be configured to generate the second updated SLM 370.

The second method 500 hence advances to step 506.

Step 506: Causing a Trained SLM, Generated after the Plurality of Training Iterations, to Execute the NLP Task in Lieu of the LLM At step 506, similar to step 406 of the first method 400, the processor 110 can be configured to use the second updated SLM 370 instead of the LLM 250 for executing tasks in accordance with the task definition 206.

The second method 500 hence terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for transferring knowledge from a Large Language Model (LLM) to a Small Language Model (SLM) for training the SLM to execute a Natural Language Processing (NLP) task, the method comprising:

during a first training iteration of a plurality of training iterations:

acquiring, from a user, a client input including: (i) the NLP task for the SLM, (ii) a plurality of data samples responsive to the NLP task, and (iii) an indication of the SLM;

generating, using the LLM, a plurality of training samples for the SLM based on the NLP task and the plurality of data samples, the plurality of training samples being in-distribution training samples;

training the SLM based on the plurality of training samples to execute the NLP task, thereby generating a first trained SLM;

generating, using the LLM, a plurality of validation samples for the first trained SLM, the plurality of validation samples being out-of-distribution training samples with respect to the generated training sample in the first training iteration;

determining, for each validation sample of the plurality of validation samples, a current prediction accuracy value of the SLM;

selecting at least one target validation sample from the plurality of validation samples based on the current prediction accuracy value of the SLM for each of the plurality of validation samples;

generating an augmented plurality of data samples including the plurality of data samples and the at least one target validation sample; and during a second training iteration of the plurality of training iterations, following the first training iterations:

generating, using the LLM, a second plurality of training samples for the first trained SLM based on the NLP task and the augmented plurality of data samples, in lieu of the plurality of data samples;

training the first trained SLM based on the second plurality of training samples, thereby generating a second trained SLM; and causing an updated SLM, generated after the plurality of training iterations, to execute the NLP task in lieu of the LLM.

2. The method of claim 1, wherein a given data sample of the plurality of data samples includes: a given NLP query representative of the NLP task; and a respective label indicative of an NLP response to the NLP query.

3. The method of claim 1, wherein the indication of the SLM includes a desired size of the SLM.

4. The method of claim 1, wherein the indication of the SLM includes the SLM itself.

5. The method of claim 1, wherein the generating the plurality of validation samples comprises submitting, to the LLM, a respective NLP query.

6. The method of claim 1, wherein the plurality of training samples is larger than the plurality of data samples.

7. The method of claim 1, wherein the selecting the at least one target validation sample comprises selecting the at least one target validation sample in response to the current prediction accuracy value of the first trained SLM for the at least one target validation sample being within a predetermined prediction accuracy range.

8. The method of claim 1, wherein the current prediction accuracy value is represented by a respective value of a loss function of the SLM on a given validation sample of the plurality of validation samples during the first training iteration.

9. The method of claim 1, wherein the LLM and the SLM are Transformer-based language models.

10. A computer-implemented method for transferring knowledge from a Large Language Model (LLM) to a pre-trained Small Language Model (SLM) for training the SLM to execute a Natural Language Processing (NLP) task, the method comprising:

during a first training iteration of a plurality of training iterations:

acquiring, from a user, a client input including: (i) the NLP task for the pre-trained SLM, (ii) a plurality of data samples responsive to the NLP task, and (iii) the pre-trained SLM;

training the pre-trained SLM to execute the NLP task based on the plurality of data samples, thereby generating a first trained SLM;

determining, for each data sample of the plurality of data samples, a current prediction accuracy value of the SLM;

identifying, in the plurality of data samples, at least one target data sample based on the current prediction accuracy value of the pre-trained SLM for each one of the plurality of data samples;

generating an augmented plurality of data samples including the plurality of data samples and the at least one target data sample;

during a second training iteration of the plurality of training iterations, following the first training iteration:

generating, using the LLM, a second plurality of training samples for the first trained SLM based on the NLP task and the augmented plurality of data samples, in lieu of the plurality of data samples;

training the first trained SLM based on the second plurality of training samples, thereby generating a second trained SLM; and causing a trained SLM, generated after the plurality of training iterations, to execute the NLP task in lieu of the LLM.

11. An electronic device for transferring knowledge from a Large Language Model (LLM) to a Small Language Model (SLM) for training the SLM to execute a Natural Language Processing (NLP) task, the electronic device comprising at least one processor and at least one non-transitory computer-readable memory storing executable instructions, which, when executed by the at least one processor, cause the electronic device to:

during a first training iteration of a plurality of training iterations:

acquire, from a user, a client input including: (i) the NLP task for the SLM, (ii) a plurality of data samples responsive to the NLP task, and (iii) an indication of the SLM;

generate, using the LLM, a plurality of training samples for the SLM based on the NLP task and the plurality of data samples, the plurality of training samples being in-distribution training samples;

train the SLM based on the plurality of training samples to execute the NLP task, thereby generating a first trained SLM;

generate, using the LLM, a plurality of validation samples for the first trained SLM, the plurality of validation samples being out-of-distribution training samples with respect to the generated training sample in the first training iteration;

determine, for each validation sample of the plurality of validation samples, a current prediction accuracy value of the SLM;

select at least one target validation sample from the plurality of validation samples based on the current prediction accuracy value of the SLM for each of the plurality of validation samples;

generate an augmented plurality of data samples including the plurality of data samples and the at least one target validation sample; and during a second training iteration of the plurality of training iterations, following the first training iteration:

generate, using the LLM, a second plurality of training samples for the first trained SLM based on the NLP task and the augmented plurality of data samples, in lieu of the plurality of data samples;

train the first trained SLM based on the second plurality of training samples, thereby generating a second trained SLM; and cause an updated SLM, generated after the plurality of training iterations, to execute the NLP task in lieu of the LLM.

12. The electronic device of claim 11, wherein a given data sample of the plurality of data samples includes: a given NLP query representative of the NLP task; and a respective label indicative of an NLP response to the NLP query.

13. The electronic device of claim 11, wherein the indication of the SLM includes a desired size of the SLM.

14. The electronic device of claim 11, wherein the indication of the SLM includes the SLM itself.

15. The electronic device of claim 11, wherein to generate the plurality of validation samples, the at least one processor further causes the electronic device to submit, to the LLM, a respective NLP query.

16. The electronic device of claim 11, wherein the plurality of training samples is larger than the plurality of data samples.

17. The electronic device of claim 11, wherein to select the at least one target validation sample, the at least one processor further causes to select the at least one target validation sample in response to the current prediction accuracy value of the first trained SLM for the at least one target validation sample being within a predetermined prediction accuracy range.

18. The electronic device of claim 11, wherein the current prediction accuracy value is represented by a respective value of a loss function of the SLM on a given validation sample of the plurality of validation samples during the first training iteration.

19. The electronic device of claim 11, wherein the client input further comprises a plurality of user-generated validation samples having human-generated labels.

20. The electronic device of claim 19, wherein the human-generated labels are free of noise.

* * * * *